United States Patent [19]
Dodge

[11] Patent Number: 4,978,301
[45] Date of Patent: Dec. 18, 1990

[54] EDUCATIONAL CONSTRUCTION SET

[76] Inventor: Tyler H. Dodge, 130 Cooders Rd., Arcata, Calif. 95521

[21] Appl. No.: 355,208

[22] Filed: May 22, 1989

[51] Int. Cl.$^5$ .................................... G09B 19/00
[52] U.S. Cl. .................... 434/96; 446/901; 446/112; 446/108
[58] Field of Search .............. 434/81, 96, 97, 170, 434/171; 446/901, 108, 109, 110, 111, 112, 116, 119, 120, 476, 487; 273/DIG. 30; 24/306, 442

[56] References Cited

U.S. PATENT DOCUMENTS

| | | | |
|---|---|---|---|
| Re. 19,238 | 7/1934 | Burke | 434/96 |
| 1,265,720 | 5/1918 | Andree | 84/472 |
| 1,620,574 | 3/1927 | Savage | 446/85 |
| 2,369,804 | 11/1943 | Schoolfield et al. | 434/167 |
| 3,316,669 | 5/1967 | Nachbar | 446/901 X |
| 3,726,027 | 4/1973 | Cohen et al. | 35/72 |
| 4,267,662 | 5/1981 | Gordy | 446/121 X |
| 4,427,390 | 1/1984 | Manger | 434/159 |
| 4,519,781 | 5/1985 | Boyd | 434/156 |
| 4,579,537 | 4/1986 | Leahy | 446/99 X |
| 4,699,385 | 10/1987 | Bifulco | 273/260 |

FOREIGN PATENT DOCUMENTS

| | | | |
|---|---|---|---|
| 3726618 | 2/1989 | Fed. Rep. of Germany | 446/901 |
| 1300206 | 6/1962 | France | 446/901 |
| 608397 | 9/1948 | United Kingdom | 446/901 |
| 2082925 | 9/1980 | United Kingdom | 446/119 |

*Primary Examiner*—Robert Bahr
*Assistant Examiner*—Rachel M. Healey
*Attorney, Agent, or Firm*—Thomas Schneck

[57] ABSTRACT

A construction set suitable and safe for children of various ages comprising construction pieces and connector strips. The construction pieces have a semirigid planar construction with opposing major sides which have hook fastener material disposed on one side and loop pile fastener material disposed on the other. The fastener materials are of the type which adhere when pressed together. An outer border or margin area of the construction pieces is kept free of the fastener materials, to provide a tab or hem for separating attached pieces. The construction pieces have various shapes and sizes with which many designs and structures may be constructed. The connector strips have a similar construction to the construction pieces and are used to join adjacent construction pieces. The sides may include complementary colors and patterns.

23 Claims, 3 Drawing Sheets

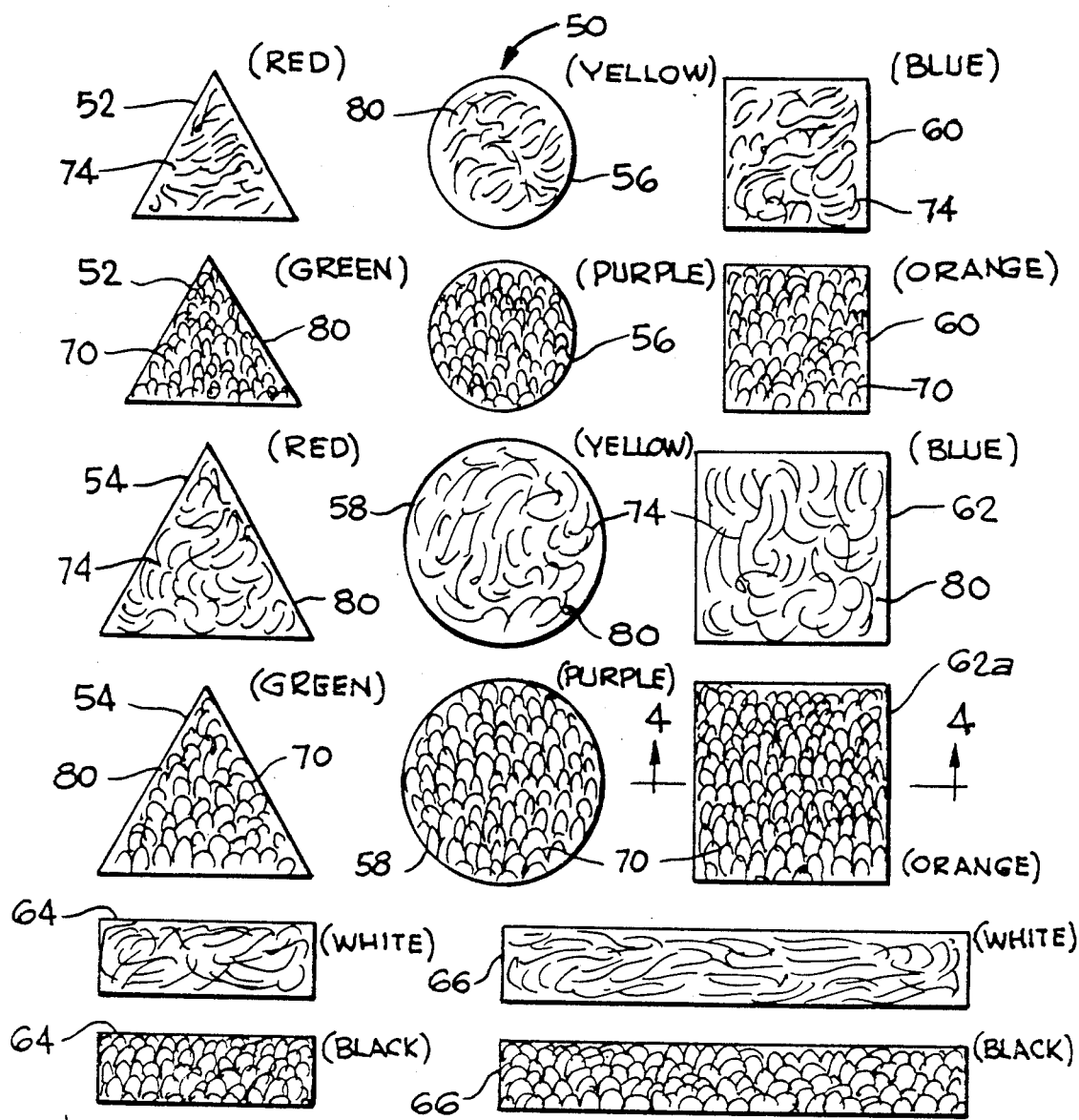
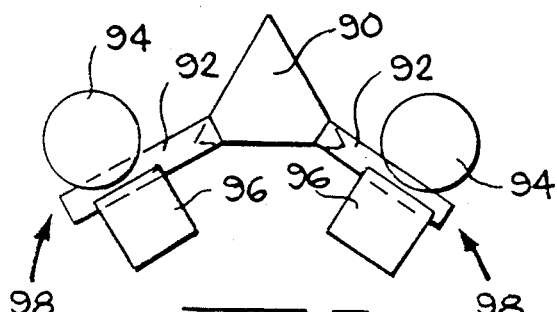
Fig. 3
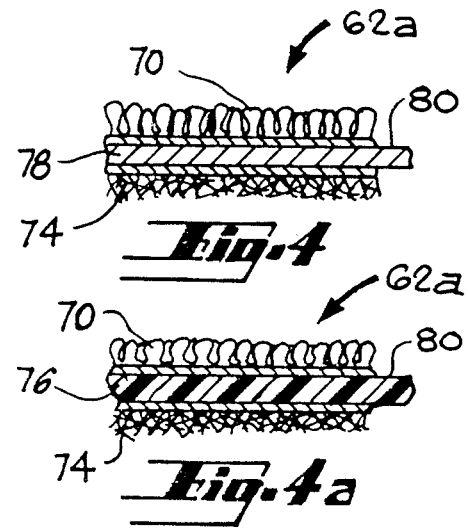
Fig. 4
Fig. 4a
Fig. 5

EDUCATIONAL CONSTRUCTION SET

TECHNICAL FIELD

The present invention relates to educational toys and more particularly to construction sets.

BACKGROUND ART

In recent years there has been an increasing concern of providing safe play toys for children. Most packages for children's toys contain a suggested age group, for which the toy is considered safe and suitable. Frequently, however, there are children of various age groups within a home or child care provider and toys which are suitable for an older age group may be unsafe for younger children.

Construction sets with pieces that attach to one another have been popular for many years. A construction set which has become very popular involves rigid pieces which are connected using interlocking pegs and holes. This type of construction set is suitable for children over five years old, but the precise alignment of the pieces requires more coordination than possessed by many young children. Furthermore, the individual pieces of these construction sets are often very small, posing a safety hazard for infants and toddlers, as these pieces can be placed in a mouth and swallowed.

Another type of construction set is disclosed by Savage in U.S. Pat. No. 1,620,574, wherein rigid wood building blocks are covered with a fibrous material that is coated on the outside with unvulcanized rubber so that the blocks stick to each other. Because of the rigidness of these blocks, injuries may occur if pieces are thrown or stepped on. Also, young children may have difficulty using these blocks because of their thickness and weight.

Non-rigid construction pieces have been developed with special emphasis placed on education and instruction, rather than the building of structures. Early designs used flannel or felt covered boards to which fabric pieces could be attached. Examples of this type are found in U.S. Pat. Nos. 1,265,720 to Andree, Re. 19,238 to Burke, and 2,369,804 to Schoolfield et al. Later developed designs have used Velcro to attach pieces to a carrier. Velcro is a trademark owned by Velcro USA, for synthetic materials which adhere when pressed together. Examples of this type are found in U.S. Pat. Nos. 4,427,390 to Manger and 4,519,781 to Boyd. The purposes of the above devices are related to teaching music, letters, colors and shapes. A characteristic of these educational instruments is that the construction pieces are attached to a board or carrier and not to each other to form a structure.

Cowen et al. in U.S. Pat. No. 3,726,027 describes an educational toy that is shaped as a cuboctahedron. The outer faces are covered with fabric of different colors and textures. Cutouts, such as letters and numerals, can be removably adhered to the fabric covered faces. There may also be an opening in the toy through which a child may touch an inner face which has a different texture than the outer face.

A chess puzzle board is disclosed by Bifulco in U.S. Pat. No. 4,699,385. The chess board consists of various puzzle pieces which when properly put together form a chess board. The black and white squares are represented by alternating hook and loop pile fastener material rather than by color. The chess pieces also have hook and loop pile fastener material on their bottoms to attach to the chess board. A base is provided into which the chess board fits and attaches by means of hook and loop pile fastener material. The puzzle pieces may alternatively be connected along their edges to form different structures. This game set is directed towards older children.

It is an object of the present invention to design a construction set which is educational, safe, fun and suitable for children of various ages.

SUMMARY OF THE INVENTION

The above object has been accomplished by a set of construction pieces, wherein each construction piece has opposed major sides which are distinctively related in at least one and preferably two or more respects. The construction pieces have various shapes and colors, and may be removably attached to one another to form self-supporting structures and designs.

Each construction piece is made from a fabric or plastic sheet cut into a particular shape which then has loop pile fastener material and hook fastener material either glued or sewn to opposite sides of the fabric or plastic piece. Hook and loop pile fastener materials mechanically adhere when pressed together. The hooks on the hook material are generally stiff and pointy while the loops on the loop pile material are more pliant. Therefore, the two sides of the construction piece feel different and only attach to other pieces having the opposite type of fastener material. Thus, there are two distinct binary relations between the sides. These relations may be further supported by different colors or patterns on the two sides. Preferably, a primary color is on one side and the complementary color is on the opposite side. Connector strips which act like bandages may be used to connect different construction pieces together. The connector strips, like the construction pieces, have loop pile and hook pile fastener material on opposite sides. Using the connector strips, construction pieces can be interconnected to form self-supporting structures and designs.

The construction set is made suitable for children as young as six months old by using fastener materials with a lower density of hooks and/or loops than is normally used in standard materials of this type. Therefore, less effort is required to pull attached pieces apart. Also, an outer margin on each side is kept free of the fastener material so that there is a free edge to grab onto when separating pieces. The pieces are also made sufficiently large, so that infants and toddlers are unable to swallow the pieces.

An advantage of the present invention is that it is suitable and of interest to children of various ages, since the pieces can be used to construct very basic designs as well as complex structures. Moreover, the present construction set may be used for complex educational purposes, such as diagramming chemical formulas or mathematical problems.

Another advantage of the present invention is its inherent safety due to the light weight and pliability of the construction pieces. Throwing or stepping on these pieces is not likely to cause physical injury. Furthermore, the construction pieces and connector strips are sufficiently large to prevent a child from completely placing a piece within a mouth. The construction pieces and connector strips are washable. Yet another advantage is the self-teaching aspects of the set. The binary relation of the fastener material can be used to teach other binary relations. Thus, the present construction set is both safe and suitable for situations having children of varying age groups.

BRIEF DESCRIPTION OF THE DRAWINGS

FIG. 3 is a plan view of a construction set.

FIG. 4 is a cross-sectional view of a construction piece taken along lines 4—4 in FIG. 3.

FIG. 4a is a cross-sectional view of a second embodiment of the construction piece of FIG. 4.

FIG. 5 is a plan view of a chemical diagram using pieces from the construction set of FIG. 3.

BEST MODE FOR CARRYING OUT THE INVENTION

Figure 1:
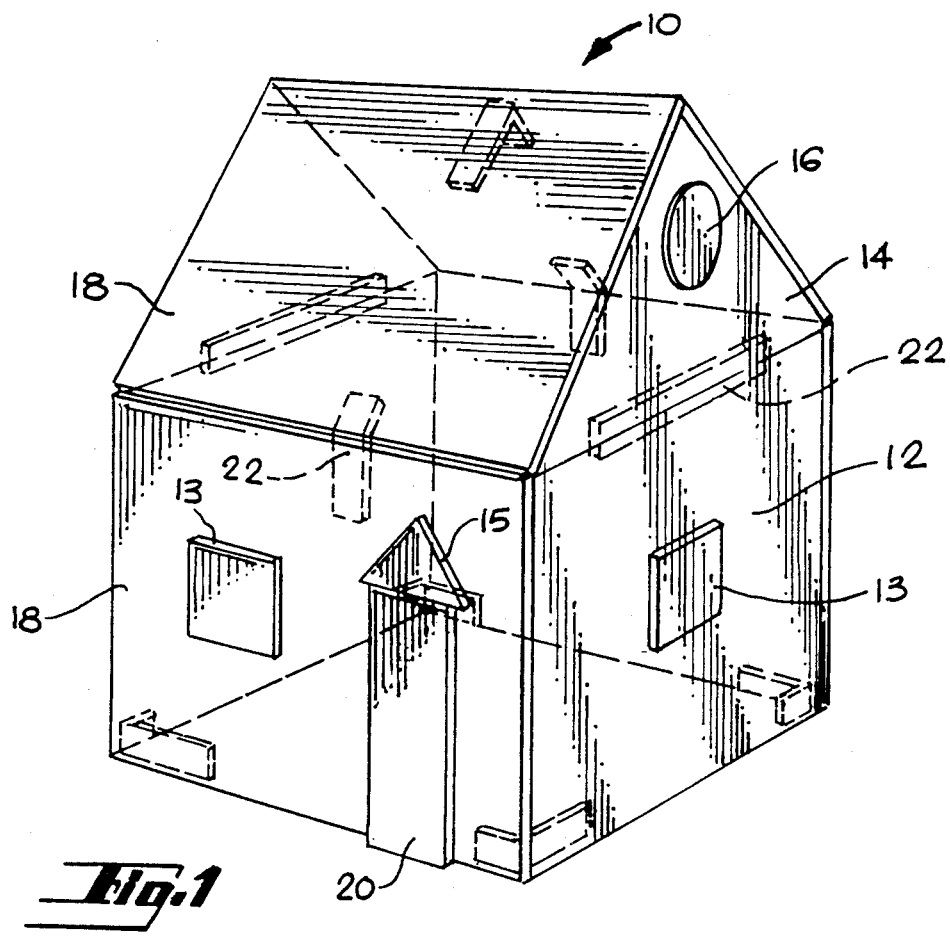
FIG. 1 is a perspective view of a structure built in accord with the present invention.
Figure 1A:
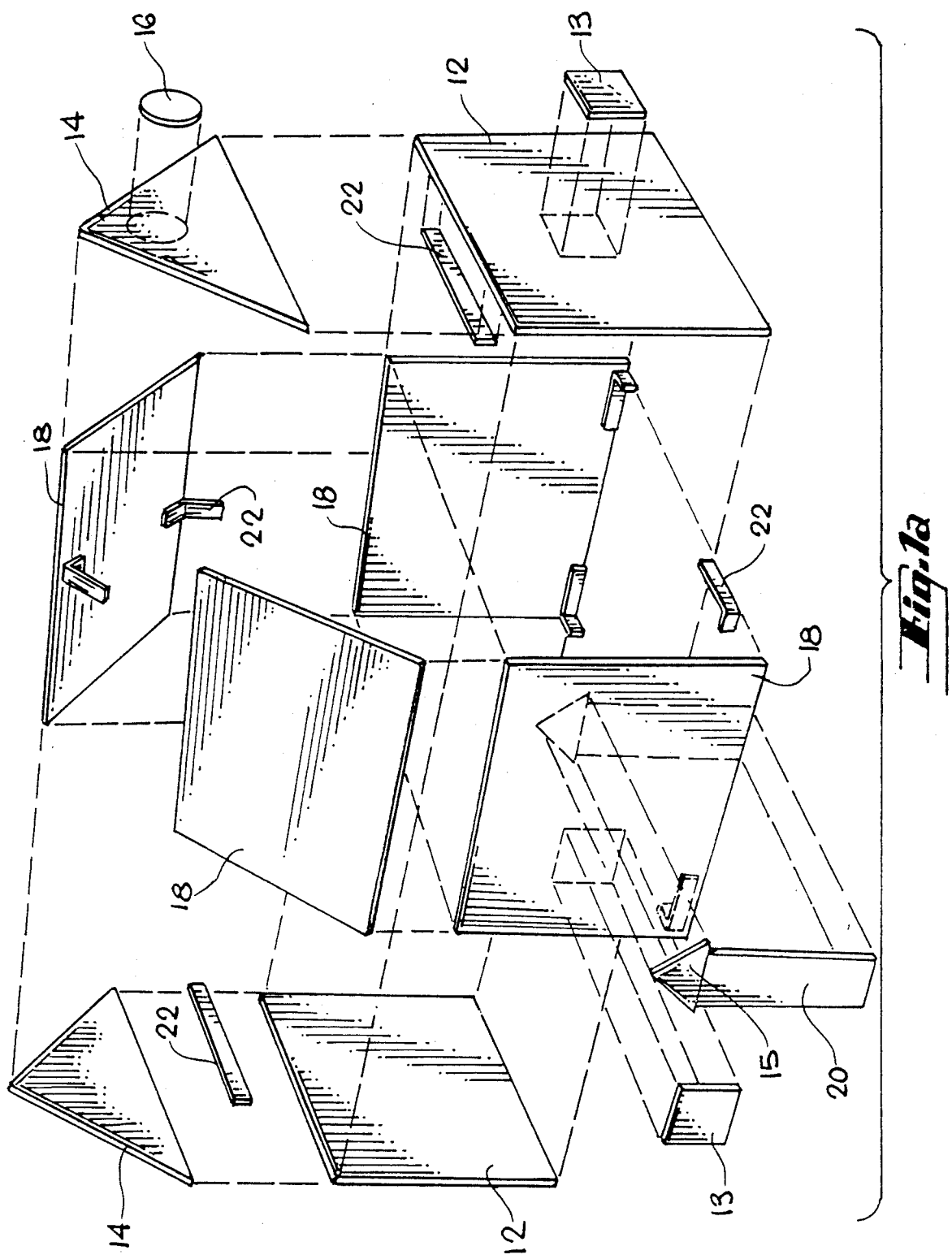
FIG. 1a is an exploded view of the structure of FIG. 1.

Referring to FIGS. 1 and 1a, a house 10 is illustrated having been constructed with construction pieces held together by connector strips. The ends of the house 10 are made with a large square piece 12 and a large triangular piece 14 connected together by a connector strip 22. A small circular piece 16 and a small square piece 13 are attached to the large triangular piece 14 and the large square piece 12 respectively, to represent windows. The front and back of the house are made with large rectangular pieces 18 connected to the ends of the house 10 with connector strips 22. A small triangular piece 15 and a small rectangular piece 20 are attached to the front of the house to represent a doorway, while a small square piece 13 is attached to represent a window. A roof to the house is constructed from two large top rectangular pieces 18, held in place by connector strips 22.

Each construction piece 12–20 and connector strip 22 has on one side loop pile fastener material and on the opposite side hook fastener material. These two fastener materials adhere to each other when pressed together and are discussed more fully below in relation to FIG. 3 and FIGS. 4 and 4a. The house 10 or other structures are built by piecing together the construction pieces 12–20 using the connector strips 22. The connector strips 22 act as a bandage in connecting other pieces together. Also, the construction pieces may be connected by overlapping the various pieces. The construction pieces and connector strips are semi-rigid so that the structures built are self-supporting without being rigid. Using just a few simple shapes it is possible to build many various structures.

Figures 2A, 2B, 2C, 2D:
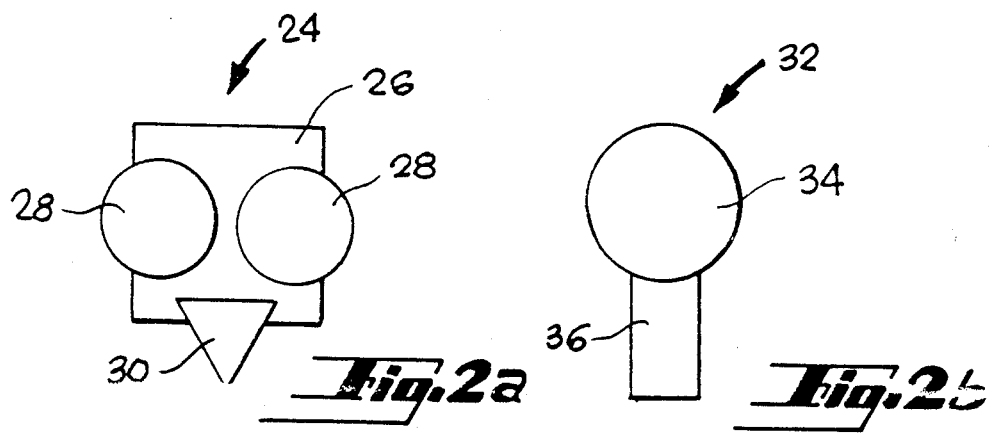
FIGS. 2a–d are plan views of simple designs in accord with the present invention.

Turning now to FIGS. 2a–d, many simple two-dimensional mosaics and designs may be constructed using the construction pieces and connector strips of the present invention. FIG. 2a depicts a face 24 made out of a large square-shaped construction piece 26, two circular construction pieces 28 and a triangular construction piece 30. The circular pieces 28 and the triangular piece 30 are placed on top of the large square piece 26. In FIG. 2b, a tree 32 is represented by a circular construction piece 34 and a connector strip 36, and in FIG. 2c, a house 38 is represented by a square piece 40 and a triangular piece 42. A pair of glasses 44, shown in FIG. 2d, is made from circular pieces 46 adhered to connector strips 48. The glasses 44 or other designs may be used as decorations.

A set 50 of construction pieces and connector strips is shown in FIG. 3. The set 50 comprises two of each of the following construction pieces: (a) a small triangle 52, (b) a large triangle 54 (c) a small circle 56, (d) a large circle 58, (e) a small square 60, (f) a large square 62, and two of the following connector strips: (g) a short strip 64, an (h) a long strip 66. The triangles 52 and 54 are isosceles triangles with the sides of the small triangles 52 having a minimum length of 3 and ½ inches. The large triangles 54 may have sides with a length of about 5 inches. The small squares 60 have sides equal in length to the sides of the small triangles 52 and the large squares 62 have sides equal in length to the sides of the large triangles 54. The small circles 56 have a diameter of about 5 inches while the large circles 58 have a diameter of about 6 and ½ inches. The short strips 64 are about 4 and ½ inches long and 2 inches wide, while the long strips 66 are about 6 inches long and 2 inches wide. The dimensions of the construction pieces and connector strips are not critical, as long as the pieces and strips are large enough to be difficult for infants and small children to put completely in their mouths.

Referring now to FIGS. 3, 4 and 4a, construction pieces are shown to have disposed on either side fastener material which adheres mechanically when pressed together. Standard fastener materials of this type are Velcro Hook 88 and Loop 1000, which when pressed together and then peeled apart, have a peel shear stress of 14.0 psi along the length and 10.5 psi along the width. It is desirable that the construction pieces and connector strips have a lower peel shear stress than standard Velcro, thereby enabling very small children to pull attached pieces apart. This may be accomplished by using a hook fastener material which has a lower density of hooks than the standard Hook 88 material which has more than 300 hooks per square inch made from 0.80 mil nylon monofilament. A hook material with a hook density in the range 50 to 150 hooks per square inch would significantly reduce the peel shear stress when used with standard Loop 1000 material.

In FIG. 4, a construction piece 62a has a semirigid fabric base layer 78 to which the fastener material is permanently attached. One side of the fabric base layer has hook fastener material 70, while the opposite side has loop pile fastener material 74. In FIG. 4a a flexible plastic material is used to make a plastic base layer 76. The fastener material 70 and 74 may either be sewn or glued to either base layer 76 or 78. Typically a construction piece is made by cutting a particular shaped piece out of a sheet of base material. Corresponding pieces of fastener material having the same shape only slightly smaller are cut out of fastener material sheets. The fastener material pieces are then adhered to opposite sides of the base layer piece leaving an exposed margin 80 of the base layer around the perimeter of the fastener material. This margin 80 serves as a tab for easing separation of pieces.

Alternatively, the fastener materials may be cut slightly larger than the base layer, so that a margin of each fastener material extends beyond the perimeter of the base layer. These margins are devoid of hooks or loops. The edges of these margins may then be sewn together to form a hem which can be used to pull attached pieces apart.

The connector pieces may be made without a margin area and further without a base layer. A strip of loop pile fastener material 74 may be simply glued or sewn to a strip of hook fastener material 70, thus making a connector strip. An alternative embodiment of a connector strip has both types of fastener material disposed on the sides. Having both types of fastener material on each side creates a universal connector strip, in that it would not matter which side of the strip was used to connect construction pieces. A universal connector strip may be made by having small sections of each type of fastener material interspersed along the sides of the strip or a fastener material with alternating hooks and loops may be used to make the universal connector strip. In the material with the alternating hooks and loops, the hooks and loops may alternate by row or alternate within a row. The construction pieces may also have universal fastener sides, wherein both types of fastener material are disposed on the sides rather than having the opposite fastener sides as shown.

When, as preferred, the sides of the construction pieces have opposite fastener material disposed on them, a pseudo polarization exists between the two types of fastener material. Like fastener materials will not adhere to each other, but opposite fastener materials will. Furthermore, the two types of fastener material have a different feel or texture, thus giving the sides a second type of polarity. These "polarities" between fastener materials, and thus opposite sides of the construction pieces and connector strips, can be advantageously used for educational purposes. For example, all sides with hook fastener material 70 have a primary color and the opposite sides 72 have the complementary color to the primary color. In this way primary and complementary colors can be self-taught. FIG. 3 illustrates a combination of primary and complementary colors wherein the loop pile containing sides of the triangles 52 and 54 are red, while the opposed hook pile containing sides are green. The circles 56 and 58 are yellow on the loop pile sides and purple of the hook sides. The squares 60 and 62 are blue on the loop pile sides and orange on the hook sides. Other colors and combinations can also be used. Alternatively different patterns could be placed on the sides. These patterns may include stripes, checkers, polka dots, paisleys, tartans, numerals, letters, symbols and pictures. Therefore, the construction set 50 may incorporate many self-teaching aspects, such as shapes, spatial relations, textures, colors, patterns, symbols, polarity and binary relations. Moreover, the construction set 50 may be used for other more complex educational functions.

In FIG. 5 a chemical formula for ferrous hydroxide is diagrammed using the construction pieces and connector strips from the construction set 50, shown in FIG. 3. Small triangle 90 has two short connector strips 92 attached at one end and extending from the small triangle 90. Attached to the opposite end of the short connector strips 92 are a small circle 94 and a small square 96, which together represent a hydroxide ion 98. The small circles 94 represent an oxygen atom and the small squares 96 represent a hydrogen atom. The connector strips 92 represent the bond between the hydroxide ions 98 and the iron atom represented by the small triangle 90. The polarity of the fastener materials can be used in diagramming chemical formulas to demonstrate which ions can and cannot be joined together. One side of a construction piece may represent a positively charged ion while the other opposite side represents a negatively charged ion. If desired, the construction pieces and connector strips may also be used to diagram mathematical problems and equations.

I claim:

1. A construction set for educational purposes, the construction set comprising,
   a plurality of planar construction pieces, each construction piece having opposed first and second major sides, said first major side having loop pile fasteners covering substantially the entirety of said first major side, said second major side having hook fasteners covering substantially the entirety of said second major side, said hook fasteners being of the type to adhere to said loop pile fastener material when pressed together, the construction pieces being of differing shapes and each construction piece being pattern independent of the others to allow construction of various structures, and
   a plurality of planar bands for connection of said construction pieces, each band having opposed major sides, with one side having loop pile fasteners and the opposed major side having hook fasteners.

2. The construction set of claim 1 wherein the differing shapes of said construction pieces are standard geometric shapes, comprising squares, triangles and circles.

3. The construction set of claim 1 wherein one of said first and second major sides of each construction piece has a first color and the opposing major side has a differing second color.

4. The construction set of claim 3 wherein said first color is a primary color and said second color is a complementary color of said primary color.

5. The construction set of claim 1 wherein coupled construction pieces have a peel shear stress of less than seven pounds per square inch in any one direction.

6. The construction set of claim 1 wherein said first and second major sides of each of said construction pieces each have a central area and an outer margin area surrounding said central area, said margin area being an area free of said loop pile and hook fasteners.

7. The construction set of claim 1 wherein said construction pieces have a minimum area of nine square inches per major side.

8. The construction set of claim 1 wherein one of said first and second major sides has a first pattern and the opposing major side has a differing second pattern.

9. A construction set for educational purposes, the construction set comprising;
   a plurality of semi-rigid, planar construction pieces of various shapes, each construction piece having opposed first and second major sides and having edges joining said major sides, said first major side having a high area central region of loop pile fastener material and said second major side having a high area central region of hook fastener material, the hook fastener material being of the type to adhere to the loop pile fastener material, each major side having a margin region surrounding the central region, the margin region and said edges being free of the fastener material, and
   a plurality of connector strips for joining construction pieces in adjacent nonplanar relation, each connector strip having opposed first and second major sides, the first major side having a covering of loop pile fastener material and the second major side having a covering of hook fastener material, thereby providing each construction piece and each connector strip of the construction set with opposed major sides having distinct characteristics with respect to mechanical coupling.

10. The construction set of claim 9 wherein said various shapes include squares, triangles, and circles.

11. The construction set of claim 10 wherein said first major side of each construction piece and each connector strip has a first color and said second major side of each piece and strip has a differing second color.

12. The construction set of claim 11 wherein said first color is a primary color and said second color is a complementary color of said primary color, said squares having a first primary color on said first side, said triangles having a second primary color, and said circles having a third primary color.

13. The construction set of claim 9 wherein said loop pile and hook fastener material when pressed together have a peel shear stress of not more than seven pounds per square inch in any one direction.

14. The construction set of claim 9 wherein said construction pieces and connector strips have a minimum area of nine square inches per major side.

15. The construction set of claim 9 wherein one of said first and second major sides of one construction piece has a first pattern and the opposing major side has a differing second pattern.

16. A construction set for educational purposes, the construction set comprising,
a plurality of semi-rigid, pattern-independent planar construction pieces of various shapes including squares, triangles and circles, each construction piece having opposed first and second major sides and having edges joining the major sides, said first major side having a central area covered by loop pile fastener and said second major side having a central area covered by hook fastener material, the hook fastener material being of the type to adhere to the loop pile fastener material, each major side having a narrow margin area bordering the central area, the margin area and said edges being free of fastener material, one of said first and second major sides having a primary first color and said opposite major side having a complementary second color of said first color, said first and second colors covering the central area of their respective sides, and
a plurality of generally rectangular shaped connector strips for joining construction pieces in adjacent relation, each connector strip having opposed first and second major sides, the first major side having loop pile fastener material and the second major side having hook fastener material, said first major side of all connector strips having a first color and said second major side of all connector strips having a differing second color, thereby providing each construction piece and connector strip of the construction set with major sides having distinct characteristics with respect to mechanical coupling and color.

17. The construction set of claim 16 wherein each square shaped construction piece has a first pair of primary and complementary colors, each triangular shaped construction piece has a second pair of primary and complementary colors and each circular shaped construction piece has a third pair of primary and complementary colors.

18. The construction set of claim 17 wherein said margin areas are of a third color, the third color differing from said first and second colors.

19. The construction set of claim 16 wherein said loop pile and hook fastener material when pressed together has a peel shear stress of not more than seven pounds per square inch in any one direction.

20. The construction set of claim 19 wherein each of said construction pieces and said connector strips have a minimum area of nine square inches per major side.

21. The construction set of claim 16 wherein each of said construction pieces includes a semi-rigid base layer sandwiched between said loop pile fastener material and said hook fastener material.

22. The construction set of claim 21 wherein said base layer extends beyond the perimeter of said fastener material to form a fastener-free tab.

23. The construction set of claim 21 wherein each of said fastener materials has a margin that extends beyond the perimeter of said base layer, the margins being free of hook and loop pile fasteners and being fixed together to form a fastener-free hem.

* * * * *